United States Patent [19]

Lindblom et al.

[11] Patent Number: 4,513,799
[45] Date of Patent: Apr. 30, 1985

[54] METHOD OF CUTTING SUBSTANTIALLY HORIZONTAL CANTILEVERED OBJECTS SUCH AS LOGS, AND APPARATUS FOR CARRYING OUT THE METHOD

[75] Inventors: Thore Lindblom; Jan-Erik Hedin, both of Alfta; Sven Wickström, Bollnäs, all of Sweden

[73] Assignee: Ostbergs Fabriks AB, Alfta, Sweden

[21] Appl. No.: 502,128

[22] Filed: Jun. 8, 1983

[30] Foreign Application Priority Data

Jun. 21, 1982 [SE] Sweden ................. 8203852

[51] Int. Cl.³ ............... A01G 27/08; B27B 1/00; B27B 13/00
[52] U.S. Cl. ................. 144/379; 30/379; 30/379.5; 30/384; 83/13; 83/796; 144/3 D; 144/335; 144/363
[58] Field of Search ........ 30/379, 379.5, 381, 30/383, 384, 385, 387; 83/13, 56, 796, 698, 928; 144/335, 363, 379, 3.0

[56] References Cited

U.S. PATENT DOCUMENTS

| 710,838 | 10/1902 | Brines | 30/379 |
| 2,487,322 | 11/1949 | Eriksson | 30/384 |
| 2,648,358 | 8/1953 | Lower | 30/379 |
| 2,992,660 | 7/1961 | Merz | 30/384 |
| 3,542,099 | 11/1970 | Gibson | |
| 4,273,169 | 6/1981 | Baenen | 30/379.5 |

FOREIGN PATENT DOCUMENTS

| 651380 | 10/1937 | Fed. Rep. of Germany . |
| 674773 | 4/1939 | Fed. Rep. of Germany . |
| 2309318 | 1/1974 | France . |
| 2271008 | 1/1974 | France . |
| 362341 | 12/1973 | Sweden . |
| 7804320 | 8/1979 | Sweden . |
| 8203852 | 12/1982 | Sweden . |

Primary Examiner—W. D. Bray
Attorney, Agent, or Firm—Willian Brinks Olds Hofer Gilson & Lione Ltd.

[57] ABSTRACT

Cutting horizontal, cantilevering objects of splittable material, such as de-barked tree trunks and the like is carried out with the aid of a guided, endless circulating saw chain (10), the upper cutting part of which is moved from below and upwards through the object. The lower edge portions of the cut surfaces at the cut are allowed to bear against each other under the action of the bending moment of the cantilevering object, while the return portion of the saw chain in the cutting area is kept free from the cut surfaces. The saw chain is guided by a chain guide (12) extending curvilinearly under the object and guides the return part of the chain. The chain guide and the guided return part are both outside and below the object during the whole of the cutting operation, while the upper cutting portion of the chain runs straight between the end points of the curved portion of the chain guide.

Towards the end of the cutting operation, the part of the object not yet sawn through is subjected solely to short-duration tensional stress and substantially not to bending stress, whereby splitting the material is avoided.

13 Claims, 9 Drawing Figures

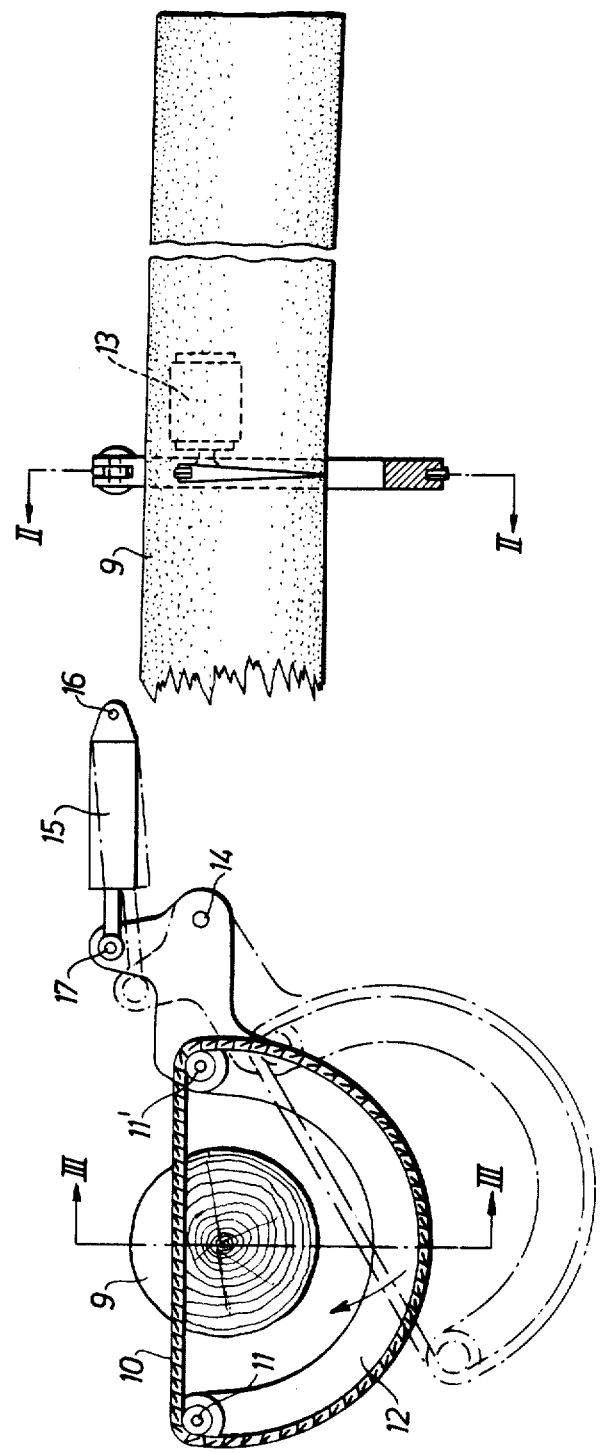

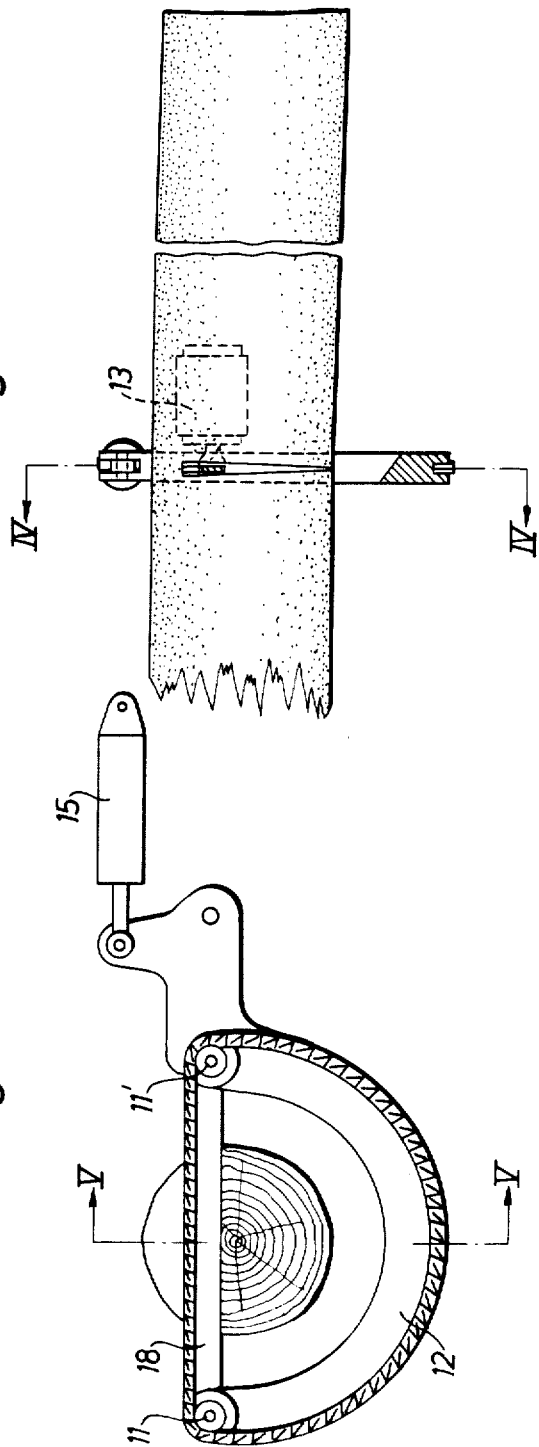

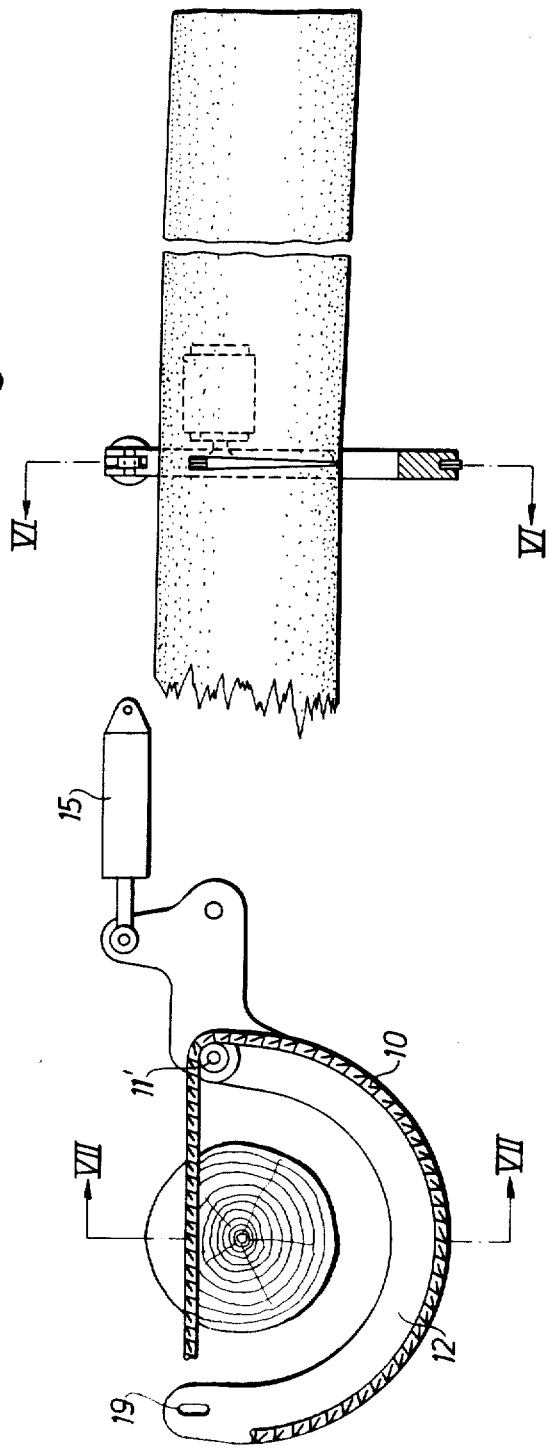

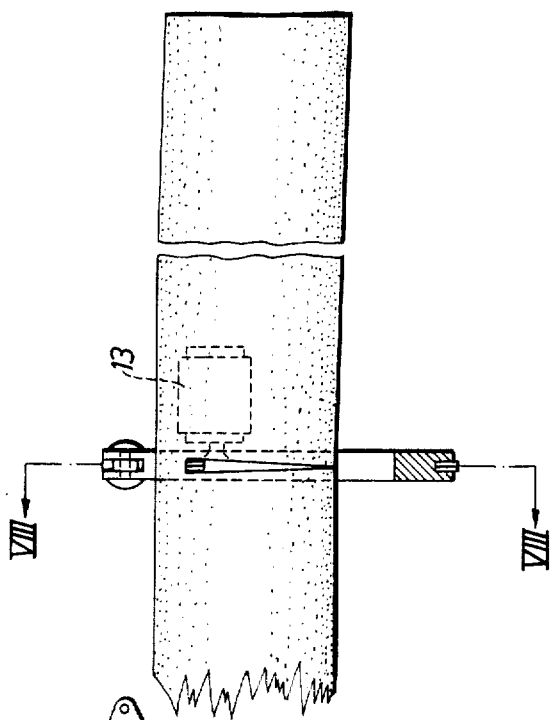
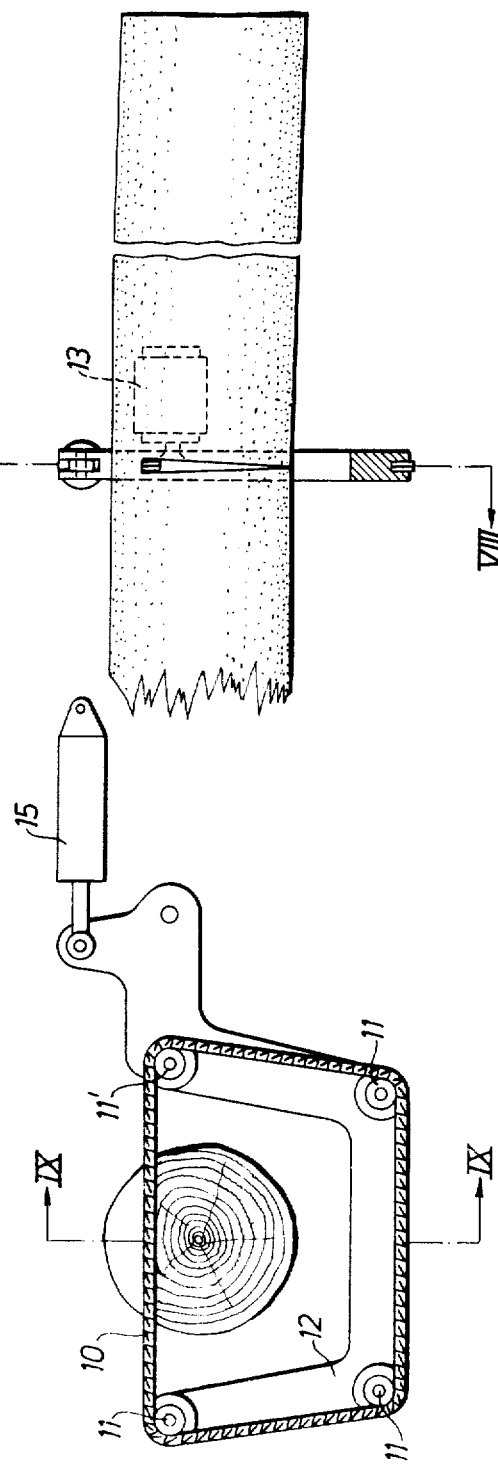

METHOD OF CUTTING SUBSTANTIALLY HORIZONTAL CANTILEVERED OBJECTS SUCH AS LOGS, AND APPARATUS FOR CARRYING OUT THE METHOD

The present invention relates to a method of cutting substantially horizontal, cantilevered objects such as logs, beams etc. with the aid of a guided endless saw chain. The invention also relates to apparatus for carrying out the method.

The operations for felling, lopping and cutting tree trunks are at the present time mechanised with the aid of mobile, wheeled machines provided with equipment for sequentially felling trees and processing them to cut logs. These machines, so-called harvesters, comprise a basic machine provided with a crane, on the outer boom end of which there is articulatedly mounted a felling unit. The boom moves the unit out towards the tree which is to be felled and applies the unit to the tree trunk immediately above the ground surface. Saw means in the unit separate the trunk from the root portion, the tree then falling to the ground in a given direction.

In a subsequent operation the tree is gripped, and with the trunk in a horizontal direction is taken through a processing means on the machine where the trunk is debranched, the ready-lopped trunk being fed out from the processing means and its cantilevering portion cut up in given lengths.

This cutting-up process can be carried out with the aid of a circular saw or a blade-like chain saw. Cutting must be done very quickly to avoid splitting at the cut. Splitting is caused by the uncut portion of the trunk being subjected to large tensional and compression stresses at the cut during the final phase of the cutting operation. If the trunk is of large dimension or the cutting means blunt, cutting may take such a long time that splitting is unavoidable. Such splitting results in that expensive material must be cut away during further processing in the saw mills.

When a circular saw or ordinary chain saw is used, the appliance is usually moved from above and downward through the tree trunk. In an attempt to avoid splitting, apparatus has been tried where the cutting member is taken through the tree trunk from below and upwards. In this case the cantilevering trunk gives rise to a bending moment due to its weight, with a resulting nip in the bottom portion of the cut, which brakes the movement of the cutting member. Attempts have been made to solve this problem by providing the cutting member with a following wedge arrangement thrusting into the cut and keeping it open. Difficulties have been encountered, however, in the coaction between cutting and wedging means, e.g. between a saw blade and the wedging arrangement, when vibrations, knots, ice formation etc. disturb the cutting process.

The invention has the object of eliminating the problems found so far in cutting horizontal cantilevering logs, so as to avoid the splitting mentioned. This object is achieved in the use of a method and apparatus in accordance with the following claims.

The invention will now be described with the aid of an embodiment and with reference to the accompanying drawings, whereon FIG. 1 illustrates a harvester for mechanical tree felling provided with cutting apparatus in accordance with the invention.

FIG. 2 is a side view of the cutting apparatus viewed along the line II—II in FIG. 3 during cutting a tree trunk.

FIG. 3 is a section along the line III—III in FIG. 2.

FIG. 4 illustrates a further embodiment of the cutting apparatus as seen in side view from the line IV—IV in FIG. 5.

FIG. 5 is a section along the line V—V in FIG. 4.

FIG. 6 is a side view similar to FIG. 2, with varied detail implementation.

FiG. 7 is a section along the line VII—VII in FIG. 6.

FIG. 8 illustrates a still further embodiment of the cutting apparatus as seen from the line VIII—VIII in FIG. 9.

FIG. 9 is a section along the line IX—IX in FIG. 8.

Figure 1:
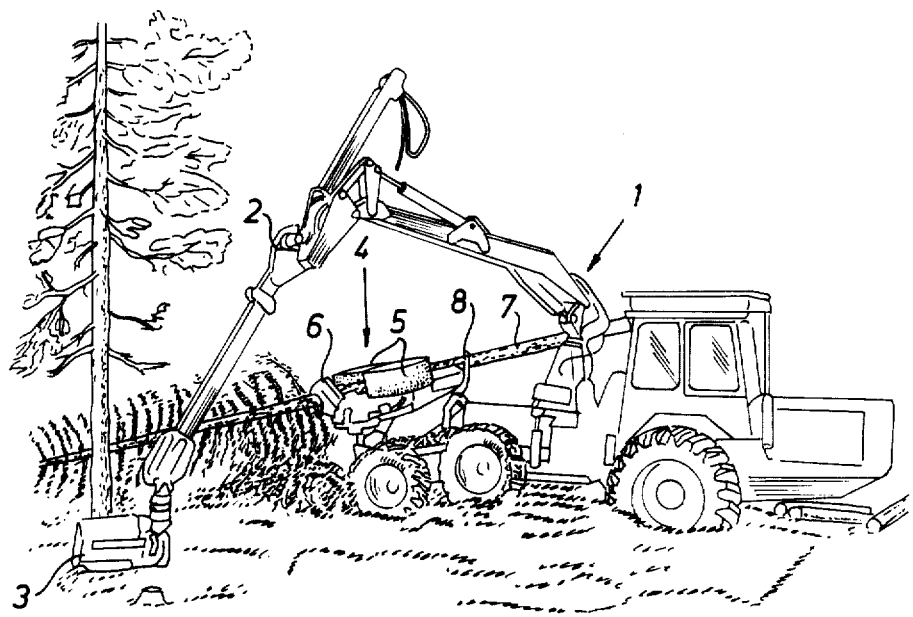

There is illustrated in FIG. 1 a so-called harvester for mechanical tree felling, generally denoted by the numeral 1. The harvester is provided with a crane apparatus 2. The outer end of the crane boom is articulatedly connected to a felling unit 3. The harvester is a mobile wheeled machine. For felling a tree. the felling unit 3 is moved towards the tree trunk an placed against it immediately above ground surface. The trunk is cut off by a saw means, e.g. in the form of a chain saw, in the unit and the tree allowed to fall to the ground in a given direction.

The trunk is then gripped by the felling unit and inserted with the bole end first in the processing apparatus 4 of the machine. In this apparatus the trunk is gripped by two feed rollers 5, 6 and fed horizontally through a lopping apparatus 6 for removing the branches on the trunk. The lopping apparatus preferably operates with a plurality of moving knives. After being fed out from the apparatus a given length, the de-branched cantilevering portion 7 of the trunk is cut with the aid of a cutting apparatus 8. As already mentioned, this operation must be done very rapidly to avoid splitting the trunk. Cutting apparatus in modern machines have a capacity of 1000 cm$^2$ per second. The normal cut length of the trunk may be 4-5 m, and the feed speed in the lopping apparatus of the trunk can obtain 2-2.5 m/s. Chain speeds of up to 30-40 m/s can be obtained when cutting with the aid of a saw chain.

FIG. 2 illustrates a cutting apparatus in accordance with the invention. The apparatus operates with an endless circulating saw chain 10 moved from below and upwards through the trunk. The saw chain is guided by a chain guide 12 and runs over sprockets 11, 11'. The sprocket 11' is driven by a hydraulic motor 13 (FIG. 3). The chain guide is pivotable about a fixed shaft 14, from an initial position indicated in the Figure by chain-dotted lines, and upwards through the trunk. This movement is carried out with the aid of a hydraulic cylinder 15 pivotably connected at 16 to the frame of the apparatus and connected to the chain guide at a pivot connection 17. As will be seen from FIG. 2, the portion of the saw chain 10 between the sprockets 11 and 11' is unsupported. This unsupported portion constitutes the operative part of the saw chain. In FIGS. 2 and 3 a major portion of the trunk 9 has been cut, the cantilevering portion of the trunk (to the right of the saw cut in FIG. 3) then tending to bend the trunk at the cut so that the lower portions of the cut surfaces are squeezed together. This does not hinder the continued operation of the chain in any way, and the cutting operation can be carried out rapidly without the chain being braked. Towards the end of the cutting operation the unsawn part of the trunk is practically only subjected to tensional stress for a very short time.

To ensure optimum cutting function during varying working conditions, the motor 13 and cylinder 15 are suitably hydraulically connected and arranged as described in the Swedish Pat. No. 330 460.

As will be seen from FIG. 2, the lower return part of the saw chain is guided along the convex curved portion of the chain guide 12. The chain guide and the bottom return part of the saw chain are disposed so as not to come into contact with the trunk or cut.

FIG. 4 illustrates an alternative embodiment of the chain guide. The operative upper part of the chain is here guided with the aid of a special straight guide rail 18, the width of which is less than that of the saw chain and thus will not come into contact with the sawn surfaces, and thus does not hinder the feeding movement of the saw chain in the cut. The apparatus otherwise operates as described above.

FIG. 6 illustrates a saw chain guide similar to the one in FIG. 2, but with the non-driven roller 11 adjustable for tensioning the chain 10. The adjustment is enabled by the sprocket 11 being mounted on a journalling pin which can be moved in an elongate mounting hole 19 in the chain guide.

FIG. 8 illustrates a still further embodiment of the invention. The chain guide 12 has here an almost rectangular shape, and the chain 10 is transported by sprockets 11, 11'. Both of the rollers 11 may be adjustable, as in the embodiment described according to FIG. 6.

The invention is described above particularly for use with cutting felled trees in conjunction with mechanized forestry felling. However, the invention can be applied in many ways, in general for cutting horizontal, cantilevering objects of splitting material, such as beams and the like, with the aid of a guided, endless saw chain.

We claim:

1. A method of cutting a substantially horizontal cantilevered object using an endless saw chain having an upper operative portion and a lower return part, said lower return part guided by a chain guide, said method comprising the steps of:
   a. moving the upper operative portion of the saw chain upwards from below the cantilevered object to cut the object; and
   b. providing a gap between the upper operative portion of the saw chain and the lower return part and chain guide so that the lower edge portions of the cut surfaces of the cantilevered object may bear against each other under the bending moment of the cantilevered portion of the object without impairing the cutting action of the saw chain.

2. The method of claim 1 wherein an upper support rail is provided for supporting the upper operative portion of said saw chain, said support rail having a width at all points less than that of the saw chain.

3. The method of claim 1 wherein the upper operative portion is moved by a hydraulic motor.

4. The method of claim 1 wherein the upper operative portion is pivotally moved upwards from below the cantilevered object.

5. The method of claim 1 wherein the cantilevered object is a felled tree.

6. An apparatus for cutting a substantially horizontal cantilevered object using an endless saw chain having an upper cutting portion and a lower return part, said apparatus comprising:

saw support means for supporting the apparatus during the cutting of the object;
a substantially U-shaped chain guide means, mounted on said saw support, for arcuately guiding the lower return part of the saw chain;
a guide sprocket attached to one end of the chain guide means;
a drive sprocket attached to the other end of the chain guide means for driving the saw chain;
said guide sprocket and said drive sprocket guiding the upper cutting portion of said saw chain in a substantially straight line;
said upper cutting portion and said guide means being arranged so as to define an internal space through which no other part of the apparatus passes, said internal space having a width and height greater than that of the cantilevered object at the point of cutting; and
means for mechanically moving said chain guide means upwards from below said object such that said upper cutting portion of said saw chain cuts substantially from below and upwards through said object and such that said chain guide means remains disposed outside and below said object while the object is cut, and there being no other part of said apparatus passing through said internal space, the lower edge portions of the cut surfaces of said object are permitted to bear against each other without impairing the cutting action of the saw.

7. The apparatus of claim 4 wherein said upper cutting portion of said saw chain extends freely between the guide sprocket and the drive sprocket.

8. The apparatus of claim 6 wherein the chain guide means is of semicircular cross-section.

9. The apparatus of claim 6 wherein the chain guide means is of rectangular cross-section and includes sprocket means, attached to the bottom of the chain guide means, for guiding the lower return part of the saw chain.

10. The apparatus of claim 6 wherein the guide sprocket is movable permitting adjustment of the saw chain tension.

11. The apparatus of claim 6 wherein the means for mechanically moving said chain guide means is a hydraulic motor.

12. The apparatus of claim 6 wherein the saw support means is a tree harvester for lopping felled trees.

13. An apparatus for cutting a substantially horizontal cantilevered object using an endless saw chain having an upper cutting portion and a lower return part, said apparatus comprising:

saw support means for supporting the apparatus during the cutting of the object;
a substantially U-shaped chain guide means, mounted on said saw support, for arcuately guiding the lower part of the saw chain;
a guide sprocket attached to one end of the chain guide means;
a drive sprocket attached to the other end of the chain guide means for driving the saw chain;
said guide sprocket and said drive sprocket guiding the upper cutting portion of said saw chain in a substantially straight line;
an upper support rail for extending between the two ends of the chain guide means for supporting the upper cutting portion of said saw chain, said upper support rail having a width at all points less than that of the saw chain;

said upper support rail and said chain guide means being arranged so to define an internal space through which no other part of the apparatus passes, said internal space having a width and height greater than that of the cantilevered object; and means for mechanically moving said chain guide means upwards from below said object such that said upper cutting portion of said saw chain cuts substantially from below and upwards through said object and such that said chain guide means remains disposed outside and below said object while the object is cut, and there being no other part of the apparatus passing through said internal space, the lower edge portions of the cut surfaces of said object are permitted to bear against each other without impairing the cutting action of the saw.

* * * * *

UNITED STATES PATENT AND TRADEMARK OFFICE
CERTIFICATE OF CORRECTION

PATENT NO. : 4,513,799

DATED      : April 30, 1985

INVENTOR(S) : Thore Lindblom, Jan-Erik Hedin and Sven Wickstrom

It is certified that error appears in the above-identified patent and that said Letters Patent is hereby corrected as shown below:

In column 3, line 36, please delete "splitting" and substitute therefor --splittable--;

In claim 7 (column 4, line 30), please delete "claim 4" and substitute therefor --claim 6--.

Signed and Sealed this

Twenty-first Day of October, 1986

[SEAL]

*Attest:*

DONALD J. QUIGG

*Attesting Officer*  *Commissioner of Patents and Trademarks*